(12) United States Patent
Chase

(10) Patent No.: US 9,195,936 B1
(45) Date of Patent: Nov. 24, 2015

(54) SYSTEM AND METHOD FOR UPDATING OR MODIFYING AN APPLICATION WITHOUT MANUAL CODING

(75) Inventor: James Edward Chase, Ashburn, VA (US)

(73) Assignee: PEGASYSTEMS INC., Cambridge, MA (US)

( * ) Notice: Subject to any disclaimer, the term of this patent is extended or adjusted under 35 U.S.C. 154(b) by 0 days.

(21) Appl. No.: 13/341,411

(22) Filed: Dec. 30, 2011

(51) Int. Cl.
  G06F 17/00 (2006.01)
  G06N 5/02 (2006.01)
  G06N 5/00 (2006.01)

(52) U.S. Cl.
  CPC ........................ *G06N 5/00* (2013.01)

(58) Field of Classification Search
  None
  See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

Anonymous "How SmartForms for Fair Blaze Advisor works", Fair Issac White Paper, http://www.fairisaac.com/, Oct. 31, 2005.

(Continued)

*Primary Examiner* — Kakali Chaki
*Assistant Examiner* — Daniel Pellett
(74) *Attorney, Agent, or Firm* — Nutter McClennen & Fish LLP

(57) ABSTRACT

The invention provides, in some aspects, a computer-implemented method for enabling enhanced functionality in a software application. The method includes executing, on a computer, an enhancement engine that is communicatively coupled to a rules base (or other store that contains rules) and/or a rules engine that executes rules (e.g., from the rules base). The enhancement engine receives a request to enable enhanced functionality in an application that is defined, at least in part, by a plurality of such rules, where the request specifies a selected rule in the application for such enhancement. The enhancement engine identifies (or ascertains) a new rule at least partially providing the enhanced functionality and (i) updates the rules base (or other store) to include the new rule along with the others that define at least a portion of the application and/or (ii) effects execution by the rules engine of the new rule along with those others.

20 Claims, 9 Drawing Sheets

(56) References Cited

U.S. PATENT DOCUMENTS

| | | | |
|---|---|---|---|
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,678,039 A | 10/1997 | Hinks et al. |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,907,490 A | 5/1999 | Oliver |
| 5,907,837 A | 5/1999 | Ferrel et al. |
| 5,910,748 A | 6/1999 | Reffay et al. |
| 5,918,222 A | 6/1999 | Fukui et al. |
| 5,920,717 A * | 7/1999 | Noda ............... 717/104 |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,300,947 B1 | 10/2001 | Kanevsky |
| 6,308,163 B1 | 10/2001 | Du et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,349,238 B1 | 2/2002 | Gabbita et al. |
| 6,351,734 B1 | 2/2002 | Lautzenheiser et al. |

(56) References Cited

U.S. PATENT DOCUMENTS

| | | |
|---|---|---|
| 6,359,633 B1 | 3/2002 | Balasubramaniam et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,460 B1 | 5/2002 | Stewart et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,426,723 B1 | 7/2002 | Smith et al. |
| 6,429,870 B1 | 8/2002 | Chen et al. |
| 6,437,799 B1 | 8/2002 | Shinomi |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,463,440 B1 | 10/2002 | Hind et al. |
| 6,473,467 B1 | 10/2002 | Wallace et al. |
| 6,473,748 B1 * | 10/2002 | Archer ............................ 706/45 |
| 6,493,331 B1 | 12/2002 | Walton et al. |
| 6,493,399 B1 | 12/2002 | Xia et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,549,904 B1 | 4/2003 | Ortega et al. |
| 6,556,983 B1 | 4/2003 | Altschuler et al. |
| 6,556,985 B1 | 4/2003 | Karch |
| 6,560,592 B1 | 5/2003 | Reid et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 * | 11/2005 | Serrano-Morales et al. ... 706/47 |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,058,367 B2 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 * | 10/2006 | Surasinghe ............................ 1/1 |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 * | 2/2007 | Subramaniam et al. ...... 715/749 |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,353,229 B2 | 4/2008 | Vilcauskas, Jr. et al. |
| 7,406,475 B2 | 7/2008 | Dorne et al. |
| 7,412,388 B2 | 8/2008 | Dalal et al. |
| 7,505,827 B1 | 3/2009 | Boddy et al. |
| 7,536,294 B1 | 5/2009 | Stanz et al. |
| 7,555,645 B2 * | 6/2009 | Vissapragada ................ 713/166 |
| 7,574,494 B1 | 8/2009 | Mayernick et al. |
| 7,596,504 B2 | 9/2009 | Hughes et al. |
| 7,640,222 B2 | 12/2009 | Trefler |
| 7,665,063 B1 * | 2/2010 | Hofmann et al. ............. 717/111 |
| 7,711,919 B2 | 5/2010 | Trefler et al. |
| 7,779,395 B1 | 8/2010 | Chotin et al. |
| 7,844,594 B1 | 11/2010 | Holt et al. |
| 7,870,244 B2 | 1/2011 | Chong et al. |
| 7,937,690 B2 | 5/2011 | Casey |
| 7,983,895 B2 | 7/2011 | McEntee et al. |
| 8,037,329 B2 | 10/2011 | Leech et al. |

(56) References Cited

U.S. PATENT DOCUMENTS

| | | |
|---|---|---|
| 8,073,802 B2 | 12/2011 | Trefler |
| 8,250,525 B2 | 8/2012 | Khatutsky |
| 8,335,704 B2 | 12/2012 | Trefler et al. |
| 8,479,157 B2 | 7/2013 | Trefler et al. |
| 8,880,487 B1 | 11/2014 | Clinton et al. |
| 8,924,335 B1 | 12/2014 | Trefler et al. |
| 8,959,480 B2 | 2/2015 | Trefler et al. |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0073337 A1 | 6/2002 | Ioele et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0154380 A1 | 8/2003 | Richmond et al. |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0054610 A1 | 3/2004 | Amstutz et al. |
| 2004/0064552 A1 | 4/2004 | Chong et al. |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0145607 A1 | 7/2004 | Alderson |
| 2004/0147138 A1 | 7/2004 | Vaartstra |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0138162 A1 | 6/2005 | Byrnes |
| 2005/0165823 A1 | 7/2005 | Ondrusek et al. |
| 2005/0216235 A1 | 9/2005 | Butt et al. |
| 2005/0234882 A1 | 10/2005 | Bennett et al. |
| 2005/0288920 A1 | 12/2005 | Green et al. |
| 2006/0004845 A1 | 1/2006 | Kristiansen et al. |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0149751 A1 | 7/2006 | Jade et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0260584 A1 | 11/2007 | Marti et al. |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 | 7/2008 | Leech et al. |
| 2008/0195377 A1 | 8/2008 | Kato et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2009/0075634 A1 | 3/2009 | Sinclair et al. |
| 2009/0132232 A1 | 5/2009 | Trefler |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0276206 A1 | 11/2009 | Fitzpatrick et al. |
| 2010/0088266 A1 | 4/2010 | Trefler |
| 2010/0107137 A1 | 4/2010 | Trefler et al. |
| 2010/0217737 A1* | 8/2010 | Shama ............................. 706/47 |
| 2012/0041915 A1 | 2/2012 | Canaday et al. |
| 2013/0007267 A1 | 1/2013 | Khatutsky |
| 2013/0231970 A1 | 9/2013 | Trefler et al. |
| 2013/0254833 A1 | 9/2013 | Nicodemus et al. |
| 2014/0019400 A1 | 1/2014 | Trefler et al. |

FOREIGN PATENT DOCUMENTS

| | | |
|---|---|---|
| EP | 0669717 A1 | 8/1995 |
| EP | 0996916 A1 | 5/2000 |
| EP | 1015997 A2 | 7/2000 |
| EP | 1019807 A2 | 7/2000 |
| EP | 1073955 A1 | 2/2001 |

(56) References Cited

FOREIGN PATENT DOCUMENTS

| | | |
|---|---|---|
| EP | 1073992 A1 | 2/2001 |
| EP | 1135723 A1 | 9/2001 |
| EP | 1163604 A2 | 12/2001 |
| EP | 1183636 A1 | 3/2002 |
| EP | 1196882 A1 | 4/2002 |
| EP | 1203310 A1 | 5/2002 |
| EP | 1208482 A1 | 5/2002 |
| EP | 1212668 A2 | 6/2002 |
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1 430 396 A1 | 6/2004 |
| EP | 1438649 A1 | 7/2004 |
| EP | 1438654 A1 | 7/2004 |
| EP | 1438672 A1 | 7/2004 |
| EP | 1483685 A1 | 12/2004 |
| EP | 1490747 A1 | 12/2004 |
| EP | 1490809 A1 | 12/2004 |
| EP | 1492232 A1 | 12/2004 |
| EP | 1782183 A2 | 5/2007 |
| EP | 1830312 | 9/2007 |
| EP | 1840803 | 10/2007 |
| EP | 2115581 A1 | 11/2009 |
| WO | WO-9838564 A2 | 9/1998 |
| WO | WO-9840807 A2 | 9/1998 |
| WO | WO-9905632 A1 | 2/1999 |
| WO | WO-9945465 A1 | 9/1999 |
| WO | WO-9950784 A1 | 10/1999 |
| WO | WO-0033187 A1 | 6/2000 |
| WO | WO-0033217 A1 | 6/2000 |
| WO | WO-0033226 A1 | 6/2000 |
| WO | WO-0033235 A1 | 6/2000 |
| WO | WO-0033238 A2 | 6/2000 |
| WO | WO-0052553 A2 | 9/2000 |
| WO | WO-0052603 A1 | 9/2000 |
| WO | WO-0140958 A1 | 6/2001 |
| WO | WO-0175610 A1 | 10/2001 |
| WO | WO-0175614 A1 | 10/2001 |
| WO | WO-0175747 A1 | 10/2001 |
| WO | WO-0175748 A1 | 10/2001 |
| WO | WO-0176206 A1 | 10/2001 |
| WO | WO-0177787 A2 | 10/2001 |
| WO | WO-0179994 A2 | 10/2001 |
| WO | WO-0221254 A2 | 3/2002 |
| WO | WO-0244947 A2 | 6/2002 |
| WO | 02/056249 A2 | 7/2002 |
| WO | WO-02080006 A1 | 10/2002 |
| WO | WO-02080015 A1 | 10/2002 |
| WO | WO-02082300 A1 | 10/2002 |
| WO | WO-02084925 A2 | 10/2002 |
| WO | WO-02088869 A2 | 11/2002 |
| WO | WO-02091346 A1 | 11/2002 |
| WO | WO-02101517 A2 | 12/2002 |
| WO | WO-02103576 A1 | 12/2002 |
| WO | WO-03021393 A2 | 3/2003 |
| WO | WO-03029923 A2 | 4/2003 |
| WO | WO-03029955 A1 | 4/2003 |
| WO | WO-03030005 A1 | 4/2003 |
| WO | WO-03030013 | 4/2003 |
| WO | WO-03030014 | 4/2003 |
| WO | WO-03058504 | 7/2003 |
| WO | WO-03069500 | 8/2003 |
| WO | WO-03071380 | 8/2003 |
| WO | WO-03071388 | 8/2003 |
| WO | WO-03073319 | 9/2003 |
| WO | WO-03077139 | 9/2003 |
| WO | WO-03085503 | 10/2003 |
| WO | WO-03085580 | 10/2003 |
| WO | WO-2004001613 | 12/2003 |
| WO | WO-2004003684 | 1/2004 |
| WO | WO-2004003766 | 1/2004 |
| WO | WO-2004003885 | 1/2004 |
| WO | WO-2004046882 | 6/2004 |
| WO | WO-2004061815 | 7/2004 |
| WO | WO-2004086197 | 10/2004 |
| WO | WO-2004086198 | 10/2004 |
| WO | WO-2004095207 | 11/2004 |
| WO | WO-2004095208 | 11/2004 |
| WO | WO-2004114147 | 12/2004 |
| WO | WO-2005001627 A2 | 1/2005 |
| WO | WO-2005003888 | 1/2005 |
| WO | WO-2005010645 A2 | 2/2005 |
| WO | WO-2005117549 A2 | 12/2005 |
| WO | WO-2006081536 A2 | 8/2006 |
| WO | 2007/033922 A2 | 3/2007 |
| WO | WO-2008109441 | 9/2008 |
| WO | WO-2009097384 | 8/2009 |

OTHER PUBLICATIONS

B. Thuraisingham, "From Rules to Frames and Frames to Rules," AI Expert, pp. 31-39, Oct. 1989.

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Busse, Ralph et al., "Declarative and Procedural Object Oriented Views", 1998, IEEE retrieved Mar. 22, 2007.

Buyya, Rajkumar et al., "Economic Models for Resource Management and Scheduling in Grid Computing," 2002. Concurrency and Computation: Practice and Experience. vol. 14. pp. 1507-1542.

Cheng and Smith, "Applying Constraint Satisfaction Techniques to Job Shop Scheduling," 1997. Annals of Operations Research. 70: 327-357 (1997).

Cheng, Cheng-Chung; Smith, Stephen F.; "A Constraint Satisfaction Approach to Makespan Scheduling," AIPS 1996 Proceedings, pp. 45-52 (1996).

Cochrane, Roberta et al., "Integrating Triggers and Declarative Constraints in SQL", p. 567-578, Proceedings of the 22nd VLDB Conference Mumbai (Bombay), India, 1996, retrieved Mar. 22, 2007.

Communication for European Patent Applicatio No. 07250848.4, dated Aug. 13, 2007 (EESR enclosed).

Communication for European Patent Application No. 05755530.2, dated Sep. 6, 2007.

Communication for European Patent Application No. 07250844.3 enclosing European Search Report, dated Jul. 11, 2007.

Communication for European Patent Application No. 07250844.3, dated Mar. 28, 2008.

Communication for European Patent Application No. 07250848.4, dated May 29, 2008.

Communication for European Patent Application No. 08731127.0, dated Oct. 13, 2009.

D. Burleson, "Adding behaviors to relational databases," DBMS, 8(10): 68(5) (1995).

E. Bertino and P. Foscoli, "Index Organizations for Object-Oriented Database Systems," IEEE Trans. on Knowledge and Data Engineering, 7(2):193-209 (1995).

F. Maryanski, et al., "The Data Model Compiler: A Tool for Generating Object-Oriented Database Systems," 1986 Int'l Workshop on Object-Oriented Database Systems, 73-84 (1986).

Francisco, S. et al. "Rule-Based Web Page Generation" Proceedings of the 2nd Workshop on Adaptive Hypertext and Hypermedia, Hypertext'98, Jun. 20-24, 1998.

FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

H.A. Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.

(56) References Cited

OTHER PUBLICATIONS

International Preliminary Report on Patentability for PCT/US2005/018599, dated Jun. 5, 2007.
International Preliminary Report on Patentability for PCT/US06/03160, dated Apr. 9, 2009.
International Preliminary Report on Patentability for PCT/US2008/05503, mailed Sep. 17, 2009.
International Preliminary Report on Patentability for PCT/US2009/032341, mailed Aug. 12, 2010.
International Search Report for PCT/US05/18599, mailed May 15, 2007.
International Search Report for PCT/US08/55503, mailed Jul. 28, 2008.
International Search Report & Written Opinion for PCT/US06/03160, mailed Jul. 21, 2008.
International Search Report & Written Opinion for PCT/US09/32341, mailed Mar. 11, 2009.
Jones, S. et al., "A User-Centered Approach to Functions in Excel," International Conference on Functional Programming, Uppsala, Jun. 30, 2003, pp. 1-12.
Kuhn, H.W. "The Hungarian Method for the Assignment Problem," Naval Research Logistics Quarterly, 2 (1955), pp. 83-97.
L.G. DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.
Lippert, Eric, "Fabulous Adventures in Coding: Metaprogramming, Toast and the Future of Development Tools," Microsoft.com Blog, MSDN Home, published Mar. 4, 2006, 6 pgs.
M. Riccuiti, "Oracle 8.0 on the way with objects: upgrade will also build in multidimensional engine," InfoWorld, V. 17(39), p. 16(1), Sep. 1995.
M. Stonebraker, "The Integration of Rule Systems and Database Systems," IEEE Trans. on Knowledge and Data Engineering, vol. 4(5), pp. 415-423, Oct. 1992.
Manghi, Paolo et. al. "Hybrid Applications Over XML: Integrating the Procedural and Declarative Approaches", 2002 ACM, pp. 1-6. Retrieved Mar. 22, 2007.
McConnell, Steven C., "Brooks' Law Repealed," IEEE Software, pp. 6-9, Nov./Dec. 1999.
Mecca, G. et al. "Cut and Paste", ACM, pp. 1-25 and Appendix I-IV (1999). Retrieved Mar. 22, 2007.
P. Morizet-Mahoudeaux, "A Hierarchy of Network-Based Knowledge Systems," IEEE Trans. on Systems, Man, and Cybernetics, vol. 21(5), pp. 1184-1191, Sep. 1991.
Reinersten, Don, "Is It Always a Bad Idea to Add Resources to a Late Project?," Oct. 30, 2000. Electronic Design. vol. 48, Issue 22, p. 70.
S. Danforth, "Integrating Object and Relational Technologies," Proc. Sixteenth Annual Int'l Computer Software and Applications Conf., pp. 225-226, Sep. 1992 (abstract).
S. Salvini and M.H. Williams, "Knowledge Management for Expert Systems," IEE Colloquium on 'Knowledge Engineering', 3 pages, May 1990.
Schiefelbein, Mark A Backbase Ajax Front-end for J2EE Applications, Internet Article, http://dev2dev.bea.com/1pt/a/433>, Aug. 29, 2005.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
T. Chan and W. Hwang, "Towards Integrating Logic, Object, Frame, and Production," Proc. Fourth Int'l Conf. on Software Engineering and Knowledge Engineering, pp. 463-469, Jun. 1992.
T. Sellis, et al., "Coupling Production Systems and Database Systems: A Homogeneous Approach," IEEE Trans. on Knowledge and Data Engineering, vol. 5(2), pp. 240-256, Apr. 1993.
V.M. Markowitz and A. Shoshani, "Object Queries over Relational Databases: Language, Implementation, and Applications," IEEE Xplore, pp. 71-80, Apr. 1993.
Vranes, S. "Integrating Multiple Paradigms within the Blackboard Framework," IEEE Transactions on Software Engineering, vol. 21, No. 3, Mar. 1995, pp. 244-262.
W. Kim, "Object-Oriented Databases: Definition and Research Directions," IEEE Trans. on Knowledge and Data Engineering, vol. 2(3) pp. 327-341, Sep. 1990.
W. Sun, et al., "Supporting Inheritance in Relational Database Systems," IEEE, pp. 511-518, Jun. 1992.
Y.-M. Shyy and S.Y.W. Su, "Refinement Preservation for Rule Selection in Active Object-Oriented Database Systems," Proc. Fourth Int'l Workshop on Research Issues in Data Engineering, pp. 115-123, Feb. 1994.
Yang, Bibo; Geunes, Joseph; O'Brien, William J.; "Resource-Constrained Project Scheduling: Past Work and New Directions," Apr. 2001.
European Search Report for Application No. 05755530.2, dated Mar. 26, 2012 (3 Pages).
[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.
Damerau, F.J., Problems and some solutions in customization of natural language database front ends. ACM Transactions on Information Systems, vol. 3, No. 2, Apr. 1, 1985, pp. 165-184.
Devarakonda et al., Predictability of process resource usage: A measurement-based study on UNIX. IEEE Transactions on Software Engineering. 1989;15(12):1579-1586.
European Office Action issued Aug. 31, 2012 for Application No. 05755530.2 (4 Pages).
European Office Action issued Jul. 9, 2012 for Application No. 07250844.3 (8 Pages).
Extended European Search Report issued Oct. 29, 2012 for Application No. 08731127.0 (8 Pages).
Johnson et al., Sharing and resuing rules-a feature comparison of five expert system shells. IEEE Expert, IEEE Services Center, New York, NY, vol. 9, No. 3, Jun. 1, 1994, pp. 3-17.
Gajos et al. SUPPLE: Automatically Generating User Interfaces. IUI 2004, 8 pages.

\* cited by examiner

Figure 8

Investigator Information

Investigator Information

Investigator Name: Doctor Jone

Contact Information

Street: 123 Main Street
City: New York
State: New York
Country: USA
Zip Code: 12345
Email: drjones@email.com
Phone: (555) 123-9876

Submit

800

SYSTEM AND METHOD FOR UPDATING OR MODIFYING AN APPLICATION WITHOUT MANUAL CODING

FIELD OF THE INVENTION

The present invention relates generally to a method and system for implementing enhanced functionality in a software application (hereinafter "application'). More specifically, embodiments of the present invention relate to a method and system for modifying an application to allow for enhanced functionality related to the collection, transmission, manipulation, display and storage of data, e.g., of a sensitive nature.

BACKGROUND OF THE INVENTION

Businesses, governmental agencies, organizations and individuals increasingly rely on applications executing on computer systems to accomplish a wide array of tasks. From filing an insurance claim to executing a financial transaction, computer systems facilitate certain actions that may be otherwise time consuming or prohibitively complex.

Computer systems are often configured by software applications that execute a series of procedural process actions or steps in order perform a desired task. For example, an application can be configured to complete an online product order by performing four steps (or process actions), including, product identification, user information collection, payment information collection, and order confirmation, where one or more of those steps is associated with a corresponding user interface.

When creating a software application, developers utilize programming languages, such as C++, Java, ASP, PHP, etc., to define the steps and, more generally, the functionality of that application. For example, in an application for charting and managing operation of a plant, a developer may draft source code programming steps in the Java language to implement the process flow, business logic, user interface and data model used to achieve the task of creating and managing human (and other) resource records. That Java code is compiled to create a version of the application which is executable by a computer system.

Applications frequently collect, manipulate, analyze or otherwise utilize data that may be considered sensitive or that may otherwise require verification, validation, or other due care. For example, an order placement application may collect credit card information or other financial data, while an enterprise human resources application may collect and store employees' social security numbers, childrens' names, and so forth. Federal regulations, state regulations and corporate privacy policies (hereinafter "data policies") often require enhanced handling of such sensitive (or other) data. A data policy may dictate that a data property be stored in an encrypted database or require detailed audit records to be generated in the event the value of the data property is modified. Additional steps may be required, as well. For example, within the health care industry, the Health Insurance Portability and Accountability Act (HIPAA) requires that a patient be notified in the event of a data breach involving the patient's personal health information.

Properly harmonizing an application with relevant data policies can be problematic. Developers who design and build applications are frequently unaware or under informed as to relevant data policies and, even those who are aware of those policies, find effecting them can be complicated and time consuming. Furthermore, even in instances where developers properly implement relevant data policies, changes to those policies can place the application out of compliance, necessitating post-facto source code re-writes.

Developers are not the only personnel in an enterprise involved in data policy compliance. Business users must often interface with the developers to identify sensitive data properties during initial design and during implementation phases. Moreover, unless those business personnel have the skills to directly modify a software application, those personnel must team with developers to enhance the functionality of a given application whenever there is a data policy change.

As a result, an object of the invention is to provide improved methods and systems for digital data processing and, more particularly, to facilitate rapid modification of software applications to provide enhanced functionality for the collection, transmission, manipulation, display and storage of data.

SUMMARY OF THE INVENTION

The foregoing are among the objects attained by the invention, which provides, in some aspects, a computer-implemented method for enabling enhanced functionality in a software application. The method includes executing, on a computer, an enhancement engine that is communicatively coupled to a rules base (or other store that contains rules) and/or a rules engine that executes rules (e.g., from the rules base). The enhancement engine receives a request to enable enhanced functionality in an application that is defined, at least in part, by a plurality of such rules, where the request specifies a selected rule in the application for such enhancement. The enhancement engine identifies (or ascertains) a new rule at least partially providing the enhanced functionality and (i) updates the rules base (or other store) to include the new rule along with the others that define the application and/or (ii) effects execution by the rules engine of the new rule along with those others.

Related aspects of the invention provide a method as described above in which the new rule comprises an updated version of at least one of the said plurality of rules that defines the application, at least in part.

Further related aspects of the invention provide a method as described above in which the new rule comprises an updated version of the selected rule.

Further related aspects of the invention provide a method as described above in which the enhancement engine reports an error if the one of the said plurality of rules is unavailable for updates.

Yet still further aspects of the invention provide a method as described above in which the receiving step includes providing a user interface that is used to specify the selected rule. In a related aspect, the receiving step includes marking the selected rule in a selectable list displayed in the user interface. In a further related aspect, the receiving step includes specifying the selected rule by marking an other rule that references the selected rule.

Other aspects of the invention provide a method as described above in which the selected rule is a data element. In a related aspect, the identifying step includes identifying a new rule that enables the application to identify an attempt to assign a new value to the data element by detecting a discrepancy between the new value and another value of the data element that was previously stored in a memory. In a still further related aspect of the invention, the new rule enables the application to perform an additional step prior to assigning the new value to the data element. The new rule can instead or in addition, perform the additional step of prompting a user to input a reason for assigning the new value. Moreover, it can enable the application to generate an audit record comprising the new value, the other value and the reason.

Yet other aspects of the invention provide a method as described above and which the new rule enables the application to perform the additional step of prompting a user to any of authenticate and re-authenticate his or her identity.

Still other related aspects of the invention provide a method as described above in which the new rule enables the application to perform an additional step of executing an approval flow.

Still yet other aspects of the invention provide a method as described above in which the receiving step includes receiving a request to enable the enhanced functionality for a rule that is an action associated with a process flow. According to these aspects of the invention, the new rule can enable the application to execute an approval flow before and/or after that action.

These and other aspects of the invention are evident in the drawings and in the text that follows.

BRIEF DESCRIPTION OF THE DRAWINGS

The present invention will be more readily understood from the detailed description of the exemplary embodiments presented below considered in conjunction with the attached drawings, of which

FIG. 8 illustrates an exemplary user interface associated with an action for a pharmaceutical research application according to one practice of the present invention.

DETAILED DESCRIPTION OF THE ILLUSTRATED EMBODIMENT

Figure 1:
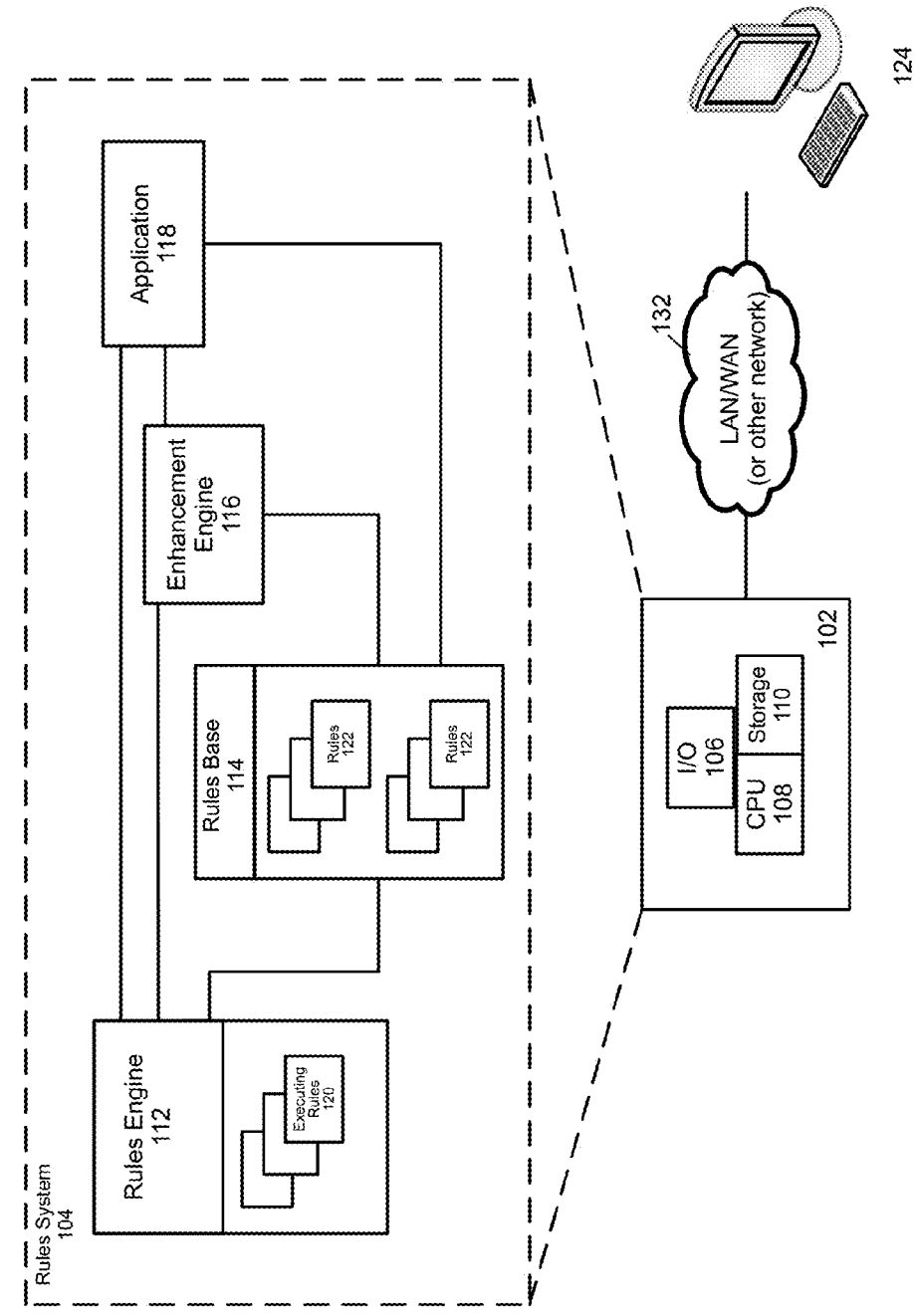
FIG. 1 illustrates an exemplary system for modifying an application according to one practice of the present invention.

FIG. 1 depicts a digital data processing system 100 according to one practice of the present invention. As illustrated in FIG. 1, the digital data processing system 100 includes a Digital Data Processor 102 communicatively connected to a User Terminal 124. In the illustrated embodiment, the Digital Data Processor 102 includes an Input/Output ("I/O") unit 106, a Central Processing Unit ("CPU") 108, and a Data Store ("Storage") 110. The Digital Data Processor 102 may be a personal computer, workstation, mainframe, or other digital data processing apparatus of the type known in the art that are capable of executing applications, programs and/or processes and that are adapted in accord with the teachings hereof. In certain embodiments, the Digital Data Processor 102 may operate alone or in other environments, networked or otherwise.

According to the embodiment of the present invention illustrated in FIG. 1, the Digital Data Processor 102 is configured to enable operation of illustrated Rules System 104, an environment for development and execution of applications, such as an Application 118. The illustrated Rules System 104 includes a Rules Engine 112, a Rules Base 114, an Enhancement Engine 116 and an Application 118. The Rules Base 114 may consist of databases, data stores, and the like, stored on any conventional digital data storage medium (e.g., RAM, CD-ROM, read-only memory, hard disk etc.) for storing and retrieving Rules 122. The Rules 122 may define any aspect of an application (sometimes referred to herein as a "rules-based application," a "software application," and so forth), including application profile data, process models, process actions, properties, and other metadata, scripts or logic necessary to support the application, as implemented and operated in accord with the illustrated architecture. In response to events signaled to and/or otherwise detected by the Rules Engine 112, the Rules Engine 112 may communicate with the Rules Base 114, or any other data store, to retrieve one or more of the Rules 122 that are stored and/or managed by the Rules Base 114 or the other data store. The Rules Engine 112 may also be configured to execute and/or otherwise process the Rules 120 that are retrieved from the Rules Base 114 or other rule repositories.

According to certain embodiments of the present invention, a rule may comprise metadata. This metadata can include data elements and/or method elements. Such method elements can be procedural or declarative. For example, a method element may be declarative insofar as it sets forth (declares) a relation between variables, values, and so forth (e.g., a loan rate calculation or a decision-making criterion), or it declares the desired computation and/or result without specifying how the computations should be performed or the result achieved. By way of non-limiting example, the declarative portion of a metadata may declare the desired result of retrieval of a specified value without specifying the data source for the value or a particular query language (e.g., SQL, CQL, .QL etc.) to be used for such retrieval. In other cases, the declarative portion of a metadata may comprise declarative programming language statements (e.g., SQL). Still other types of declarative metadata are possible. In the former regard, for example, such a structure may be procedural insofar as it comprises one or more of a series or ordered steps (e.g., in a workflow).

While some rules may comprise metadata that are wholly procedural and others may comprise those that are wholly declarative, embodiments of the present invention also contemplates rules that comprise both procedural and declarative metadata (e.g., a rule that includes one portion that defines one or more steps of a workflow and another portion that defines a decision-making criterion).

According to certain embodiments of the present invention, certain rules that comprise metadata structures may also reference and/or incorporate other such rules, which themselves may, in turn, reference and/or incorporate still other such rules. Thus, a rule represented by metadata structure may include a procedural portion that defines a workflow, or process flow, as well as a reference to another metadata-based rule that specifies a decision-making criterion for one of the steps in that workflow.

An advantage of rules that comprise metadata structures over conventional rules is that such rules provide users with the flexibility to apply any of code-based and model-driven techniques in the development and modification of software applications. Particularly, like models in a model-driven environment, metadata structures may comprise data elements that can be used to define any aspect of a digital data processing system at a higher level of abstraction than source code written in programming languages such as Java or C++. On the other hand, users may also embed programming language statements into metadata structures if they deem that to be the most efficient design for the system being developed or modified. At run-time, the data elements of the metadata structures along with programming language statements (if any) are converted into and/or used to generate executable code by the Rules Engine 112.

Rules System 104, including Rules Engine 112 and Rules Base 114, are constructed and operated in the manner of rules-based business process management systems of the type known in the art (e.g., and commercially available, for example, from the Assignee hereof, Pegasystems, Inc.), as adapted for inclusion and operation of Enhancement Engine 116 and otherwise in accord with the teachings hereof.

In some embodiments, rules may be the primary artifacts that get created, stored (e.g., in the Rules Base 114) or otherwise manipulated to define and/or modify the overall functionality of rules-based applications (e.g., such as Application 118) that businesses, governmental agencies, organizations and individuals may execute on digital data processing system 100 to accomplish any of a variety of tasks at run-time. By way of non-limiting example, a plurality of the Rules 122 stored in the Rules Base 114 define aspects of an Application 118 used within a specific industry or a business function (e.g., human resources, finance, healthcare, telecommunications etc.) or across industries (e.g., a project management application, issue-tracking application etc.), or in some other way. At run-time of the Application 118, the Rules Engine 122 may retrieve any portion of the plurality rules that define the Application 118 from the Rules Base 114. The retrieved rules may then be executed and/or otherwise processed by the Rules Engine 112 as the illustrated Executing Rules 120.

At run-time or execution of an application (e.g., Application 118), any data that is collected, generated, stored or otherwise processed by the application may be referred to as transactional data. By way of non-limiting example, transactional data may include information received through a user interface, data generated by an application (e.g., Application 118) at run-time, or information received by the application from any external process or systems. In the illustrated embodiment, such transactional data may be stored in the Rules Base 114 or any other data store accessible to the Rules System 104.

According to certain embodiments of the present invention, at least some of the rules defining Application 118 are configured as metadata structures that are used e.g., by the Rules Engine 112, to generate source code. Such source code can in turn be converted, e.g., again by Rules Engine 112, to an intermediate or executable (collectively, "executable") form, here, for example, in Java. That generation and conversion can be performed each time a particular metadata rule is retrieved for execution by the Rules Engine 112, though, preferably it is done less often. Thus, for example, in the illustrated embodiment, the first time that a particular metadata rule is implicated for a specific context at run-time of the Application 118, the metadata portion of that rule is retrieved from the rules repository (e.g., Rules Base 114) by the Rules Engine 112, used to generate Java source code that is compiled into a Java class, executed, and stored into a Java cache. All subsequent references to the same rule for the same context will simply reuse the Java class that has already been generated and stored in the Java cache. As illustrated in FIG. 1, the Executing Rules 120 may represent the Java classes, complied code and/or rules to be compiled. In alternative embodiments of the present invention, the rules may be used to generate C++ classes or other compilable, interpretable or directly executable computer code.

According to certain embodiments of the present invention, the Rules Engine 112 may only retrieve and/or otherwise process a portion of the rules that define the functionality of Application 118. By way of non-limiting example, if only a single workflow or process action of the Application 118 is implicated by a request or event signaled to and/or otherwise detected by the Rules Engine 112, the Rules Engine 112 may only retrieve and/or otherwise process the rules that are associated with the implicated workflow or process action.

According to the embodiment of the present invention illustrated in FIG. 1, the Application 118, Rules Base 114 and the Rules Engine 112 are all communicatively connected to Enhancement Engine 116, which is constructed and operated as discussed herein. In the illustrated embodiment, the Enhancement Engine 116 responds to a request for enabling enhanced functionality associated with any aspect of a software application (e.g., Application 118) by identifying one or more new rules (i.e., rules in addition to and/or modified from those that form part of the metadata and/or source code of Application 118) that may be executed or otherwise processed by the Rules Engine 112 at run-time of the application to Application 118 to implement the desired enhanced functionality, as discussed in more detail below. Those "new" rules may be updated versions of one or more rules that are currently define or are otherwise part of the application where the new rules replace/supersede the current rules, or they may be additional rules that supplement those current rules.

According to certain embodiments of the present invention, the Enhancement Engine 116 may be integrated into the Rules Engine 112 or implemented as one or more separate components and/or modules as part of the Rules System 104. Alternatively or in addition, it may be coupled to the Rules Base 114 for direct addition and/or modification of rules contained or otherwise stored in the Rules Base 114. In certain embodiments, at least a portion of the Enhancement Engine 116 may itself be implemented through rules that are stored in a rules repository (e.g., Rules Base 114) and executed at run-time using a Rules Engine (e.g., 112).

Figure 2:
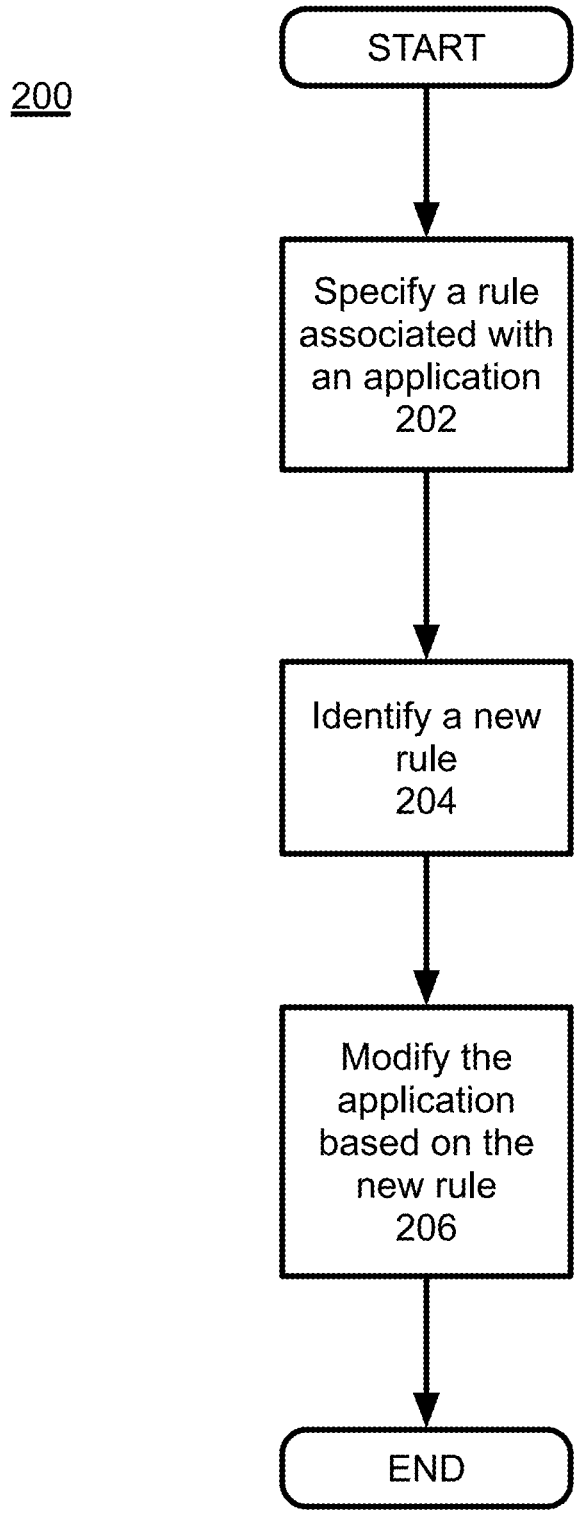
FIG. 2 illustrates an exemplary method for modifying an application according to one practice of the present invention.

FIG. 2 depicts a method 200 of illustrated Enhancement Engine 116 to modify an application (e.g., Application 118) to enable enhanced functionality. The term enhanced functionality is intended to include, but is not limited to, any supplemental functionality added to an application based on input provided by a user. By way of non-limiting example, the enhanced functionality may be implemented by updating one or more process flows within an application to include additional process actions that add steps to the process flows, alter the appearance and/or operation of user interfaces associated with the process flows, or alter any other aspect of the process flows. Furthermore, the enhanced functionality may also include providing new or additional process flow(s), process actions, user interfaces or any other configurable aspect of an application, such that enhanced functionality is enabled when the application is executed. Such enhanced functionality may enable the application to perform enhanced auditing, data encryption, resource management, access security or any other feature that was not previously associated with the application.

By way of non-limiting example, an embodiment of the present invention may be utilized in connection with an application (e.g., Application 118) used by customer service representatives (CSRs) to process customer data at a call center. In an effort to prevent unauthorized access to sensitive customer data, a business manager at the call center with no software development experience may wish to alter the functionality of the application to require all CSRs to re-authenticate themselves prior to viewing and/or processing that sensitive data. Implementing this enhanced functionality quickly without having to wait for skilled development resources to become available would help to effectively mitigate the risk associated with unauthorized access of sensitive customer information. The methods and techniques described herein provide businesses, governmental agencies, organizations and individuals with such ability to manage risk without overly relying on the routinely scarce and expensive skilled IT resources.

According to an embodiment of the present invention described in FIG. 2, method 200 begins at step 202 by specifying (e.g., through action of an administrator or other user via a user interface) a rule that is associated with an application and that is to be enhanced. Continuing the prior example, in a rules-based implementation of an application for completing an online product order, one or more rules associated with the collection of credit card numbers or other payment information will likely be specified in step 202.

Following the specification of at least one rule in step 202, method 200 continues at step 204 by identifying a new rule that defines at least a portion of the desired enhanced functionality to be performed during execution of the application. The new rule may define the enhanced functionality by providing a new action, creating an association with an existing process flow and/or otherwise enabling additional processing within the application. As used herein, the "new rule" may include one or more rules and, as otherwise evident from context, "identifying" may mean—in addition to ascertaining, determining, or the like—adding or generating one or more rules that did not previously exist, retrieving or otherwise accessing one or more rules that were not previously accessible by the Rules Engine 112, and/or updating one or more existing rules (e.g., those identified in step 202) to create a new version of the existing rule. Thus, using the example of the product ordering application above, identifying a new rule may comprise adding or generating one or more rules that define a new credit card or bank account validation process and/or updating one or more existing rules to trigger the new validation functionality after the payment information collection step of the application.

Following the identification of the new rule at step 204, the new rule is then used to modify the application, at step 206. In an instance where the new rule that defines the enhanced functionality is a modified version of an existing rule that defines at least a portion of the application, the existing rule is modified by the Enhancement Engine 116 (e.g., in the Rules Base 114 or other rules repository) and/or is communicated by the Enhancement Engine 116 to the Rules Engine 112 for execution or other processing at run time in lieu of the existing rule and in connection with the other rules defining the application. Alternatively or in addition, in an instance where the enhanced functionality is defined through one or more additional rules (i.e. rules that did not previously exist or were not previously accessible by the application), such additional rules are stored in Rules Base 114 (or other rules repository accessible by the application) along with the other existing rules defining the application and/or communicated by the Enhancement Engine 116 to the Rules Engine 112 for execution or other processing at run time in connection with the other existing rules. In addition to and/or in lieu of storing the additional rules to the Rules Base 114 and/or communicating them to the Rules Engine 112, the Enhancement Engine 116 can link or otherwise associate those additional rules with the application such that the additional rules are executed (e.g., by the Rules Engine 112) along with the application to enable the enhanced functionality.

Continuing with the example of the online product ordering application that may be modified using the method 200 shown in FIG. 2, new rule identified in step 204 may comprise one or more additional rules that define a validation process and an updated version of an existing user interface rule for payment information collection. The updated version of the user interface rule may trigger the execution of new validation process when a user inputs credit card information at the payment information collection step at run-time of the application.

In cases where identification of a new rule in step 204 comprises the Enhancement Engine 116 updating an existing rule to create a new version, the existing rule may be initially locked (e.g., by a user for other manual updates) or otherwise unavailable to be updated by the Enhancement Engine 116. In such instances, the Enhancement Engine 116 may report an error to provide notification of the failed update attempt and/or queue the update to be completed at a later time.

According to some embodiments of the present invention, a user interface may be executed or otherwise displayed (e.g., on a client device 124) to communicate with the Enhancement Engine 116 (e.g., over a network 132) in order to specify enhanced functionality to be associated with at least a portion of an application (e.g., Application 118). In such embodiments, the user interface may be configured to display a selectable list of rules that define at least a portion of the application for which enhanced functionality may be specified. These rules may be related to any aspect of the application, including but not limited to, workflow process, user interface generation, data capture and validation, integration with legacy systems, decision logic and security. The user may select one or more rules from the list for which enhanced functionality will be specified. Furthermore, a user may also indicate a type of enhanced functionality corresponding to the one or more selected rules. Still other variations in the design and functionality of the user interface are possible in other embodiments of the invention.

According to one embodiment of the invention, the rules included in the selectable list may be grouped into a process flow, or workflow category that includes the steps or actions executed to complete a given task. In this regard, it will be appreciated that each action within a process flow may have related rules that define the data elements, user interface, business logic or any other configurable setting needed to perform that action or step within a process. By way of non-limiting example, an action within a process flow configured to collect user information may have related rules which define the display and behavior of the user interface implemented to collect the user information, the data elements input and/or processed by the user interface, any data validation rules implemented by the user interface, and any other features of the user interface.

Figure 3:
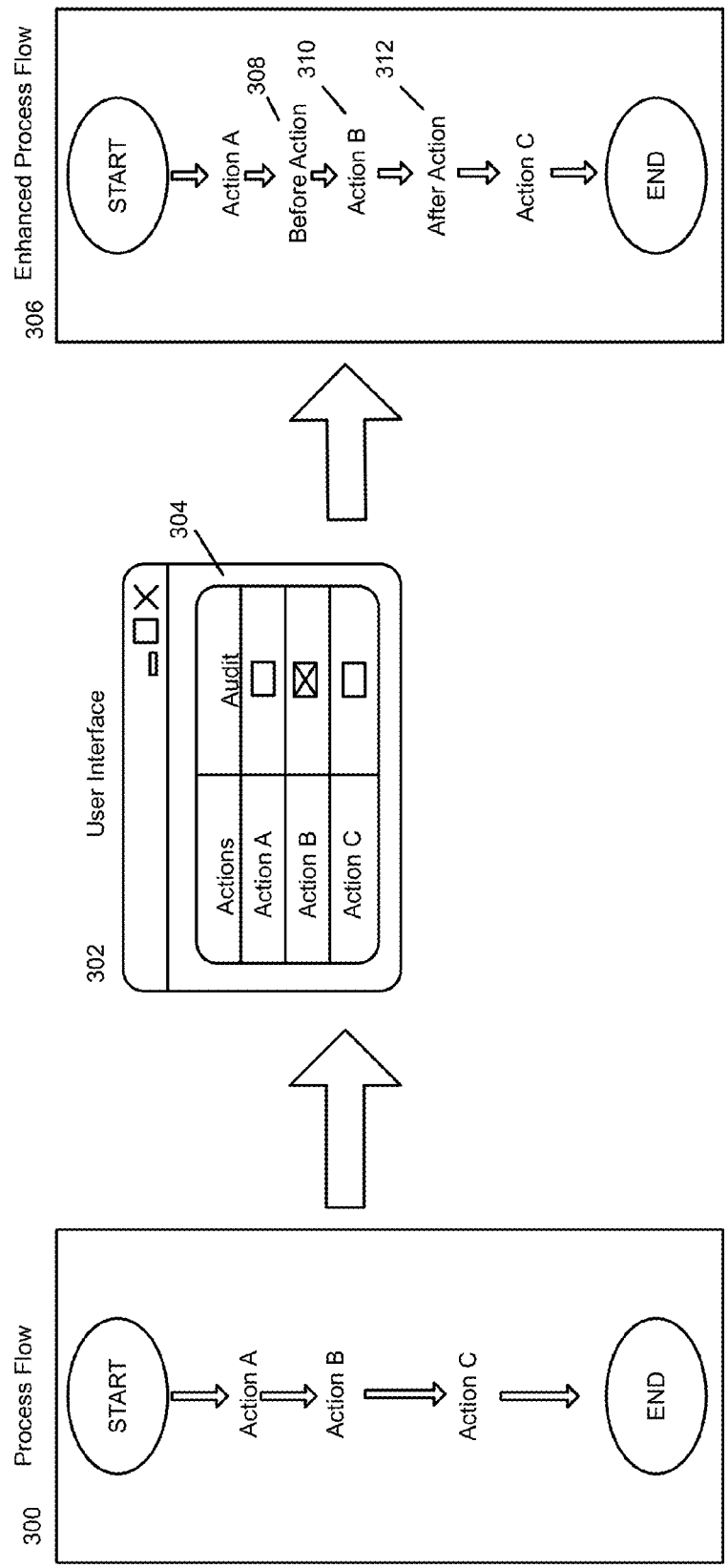
FIG. 3 illustrates an exemplary user interface utilized to modify an application according to one practice of the present invention.

As illustrated in FIG. 3, a Process Flow 300 represents a process flow that may be associated with an application (e.g., Application 118). The process flow specifies a plurality of actions to perform a task within the application. The Process Flow 300 comprises indicators for the start and end of the process flow in addition to Action A, Action B, and Action C. Actions A-C represent steps, or process actions, performed while executing the Process Flow 300. For example, in an embodiment of the present invention wherein the Process Flow 300 represents a portion of a medical billing system, Action A may be configured to collect patient address information, Action B may be configured to collect patient medical history information, and Action C may be configured to collect health insurance information.

According to the embodiment of the present invention illustrated in FIG. 3, the Enhancement Engine 116 generates a User Interface 302 related to the Process Flow 300, wherein the User Interface 302 is utilized by a user to identify which steps or actions require the addition of enhanced functionality. The User Interface 302 provides a Selectable Action List 304 which includes the actions of the Process Flow 300 (i.e., Action A, Action B and Action C). The User Interface 302 is further configured to allow for specification of a certain type of enhanced functionality (i.e., enhanced auditing) to be associated with one or more of the actions displayed in the Selectable Action List 304. As shown in the Selectable Action List 304 of the User Interface 302, the Action B has been selected for enhanced auditing. Once this selection is transmitted to the Enhancement Engine 116 through the User Interface 302, the Enhancement Engine 116 will update (e.g., by employing the method described in FIG. 2) the Process 300 to include the enhanced audit functionality for Action B. As a result, any user without any programming or other software development training (hereinafter a "business user") can easily identify actions from the Selectable Action List 304 to enable enhanced functionality without the need for writing any code or requiring the help of a skilled developer. Thus, applications can be quickly updated or modified in response to the ever-changing business requirements for such applications.

According to the illustrated embodiment in FIG. 3, an Enhanced Process Flow 306 represents an updated version of the Process Flow 300 which includes the enhanced audit functionality that was specified through the User Interface 302. At runtime of any application (e.g., Application 118) which incorporates the Enhanced Process Flow 306, the Before Action 308 and the After Action 312 will be executed to enable the enhanced audit functionality for that application. As illustrated, the Before Action 308 has been added prior to the selected Action B 310 and the After Action 312 has been added after the selected Action B 310, within the Enhanced Process Flow 306. The Before Action 308 and the After Action 312 facilitates enhanced auditing of the information related to the Action B 310 by monitoring any changes made to the values of data elements or properties associated with the Action B 310. For example, if the Action B 310 is configured to generate and display a user interface containing credit card information (e.g., cardholder name, credit card number, expiration date, security code), the enhanced audit functionality may monitor any changes made to the credit card information through that user interface while Action B 310 is being performed. To monitor such changes, the Before Action 308 may store in memory the value of the properties or data elements associated with the Action B 310 before execution of Action B 310. The value of a property or data element may comprise transactional data as described above. Following execution of the Action B 310, the After Action 312 compares the value of the properties provided in response to the Action B 310 with the value of the properties previously stored in memory. In the event of a discrepancy between the two values, the After Action 312 may trigger enhanced audit functionality by prompting a user to provide additional information to explain the reason for making the change that resulted in the discrepancy, require a user to authenticate and/or re-authenticate their identity, or require the performance of any other actions or steps that could help maintain the authenticity of the underlying data record being updated through the Enhanced Process Flow 306. Such enhanced audit functionality is further discussed below in connection with FIGS. 7, 8 and 9.

The embodiment of the present invention illustrated in FIG. 3 allows for auditing of all property values associated with a selected action (e.g., all property values associated with the Action B). As a result, if Action B provided for generating a user interface which includes the properties of user name, password and address, each of the values for these properties will be monitored for changes as a result of the selection of Action B made through the User Interface 302. However, an application may only require enhanced audit functionality for only a sub-set of the property values associated with a selected action. For example, in an embodiment of the present invention where a user interface associated with an action displays the properties of patient name, patient address and medical history, the applicable data policies for the application may only require monitoring changes to the values of the patient name and medical history and not patient address. As such, according to an embodiment of the present invention, the enhanced audit functionality may be enabled to ignore any changes made to the patient address and only trigger an enhanced audit functionality (e.g., via Before Action 308 and After Action 310 as described above) in the event that a change is made to the values of patient name and/or medical history properties. Specification of such targeted enhanced audit functionality is further explained below in connection with the discussion for FIG. 4.

Figure 4:
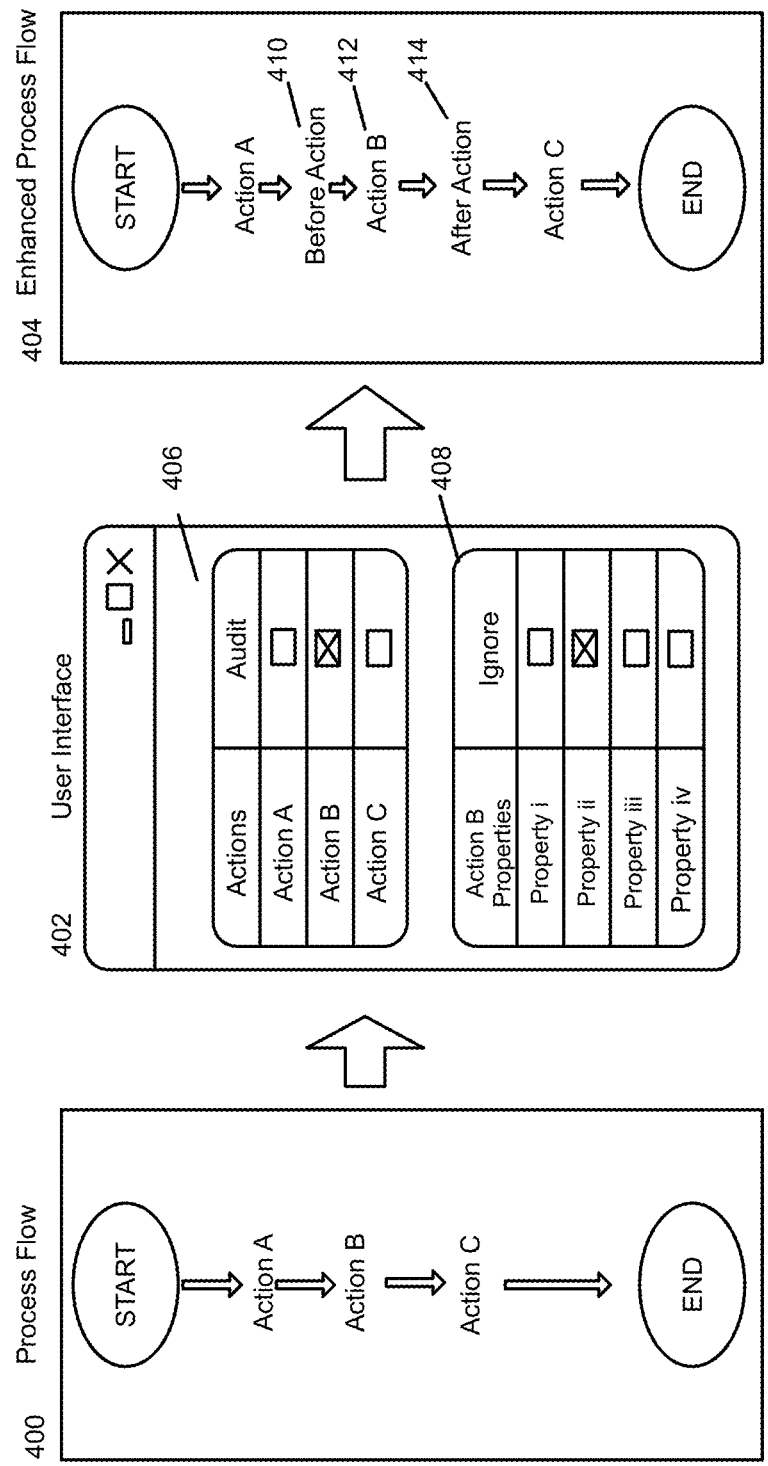
FIG. 4 illustrates an exemplary user interface utilized to modify an application according to one practice of the present invention.

FIG. 4 illustrates an alternative embodiment of the present invention configured to create an enhanced process flow for auditing certain property values associated with a selected action. Similar to the embodiment of the present invention described above in reference to FIG. 3, FIG. 4 includes a Process Flow 400, a User Interface 402 and an Enhanced Process Flow 404. The User Interface 402 is configured to display, a Selectable Action List 406 of one or more actions corresponding to the Process Flow 400. In addition, the User Interface 402 contains a Selectable Property List 408 which provides a list of one or more properties associated with a selected action in the Selectable Action List 406. To specify one or more properties to be excluded from the enhanced audit analysis, a user may tag or select those properties as "Ignore" within the Selectable Property List 408. This is illustrated in FIG. 4 where Action B has been selected from the Selectable Action List 406. Based on this selection, the Selectable Property List 408 is populated with one or more of the properties associated with or referenced by Action B. As illustrated, Property ii is tagged as "Ignore" within the Selectable Property List 408. Thus, any change in the value of Property ii as a result of the execution of Action B 412 will not trigger the enhanced audit functionality specified by After Action 414.

In order to facilitate the targeted enhanced audit functionality, the Enhancement Engine 116 may add and/or update entries in the rules repository (e.g., Rules Base 114) where the tagged/selected property rules are stored, or elsewhere in a separate database, table or other storage medium. By way of non-limiting example, such entries may be added and/or updated by the Enhancement Engine 116 after a user submits their property selection(s) from the Selectable Property List 408 using the User Interface 402. In a rules-based system (e.g., Rules System 104 in FIG. 1), the Enhancement Engine 116 may update the metadata associated with the one or more rules that define the selected properties, wherein the metadata is stored in a rule repository (e.g., Rules Base 114) and is updated to provide an indicator at run-time to ignore the selected properties for the purposes of the enhanced functionality. In another embodiment, the Enhancement Engine 116 may add a new rule or a database table to track the ignored properties at run-time. Still other variations are possible in the means to track the properties, actions, process flows or any other rule that may be selected or tagged for targeted enhanced functionality (e.g., ignoring certain properties for enhanced audit purposes).

It will be appreciated that in an alternative embodiment, the Selectable Property List 408 included in User Interface 402 may be designed differently. For example, the Selectable Property List 408 could be configured such that all properties are marked as "Ignore" and a user has to specifically tag or specify those properties that will be associated with any enhanced functionality (e.g., audit). Furthermore, the Selectable Property List 408 may be dynamically updated to add properties to and/or delete properties from the Selectable Property List 408 based on a user selecting and/or deselecting action(s) from the Selectable Action List 406. Still other variations in the design and functionality of the User Interface 402, Selectable Action List 406 and the Selectable Property List 408 are possible.

Figure 5:
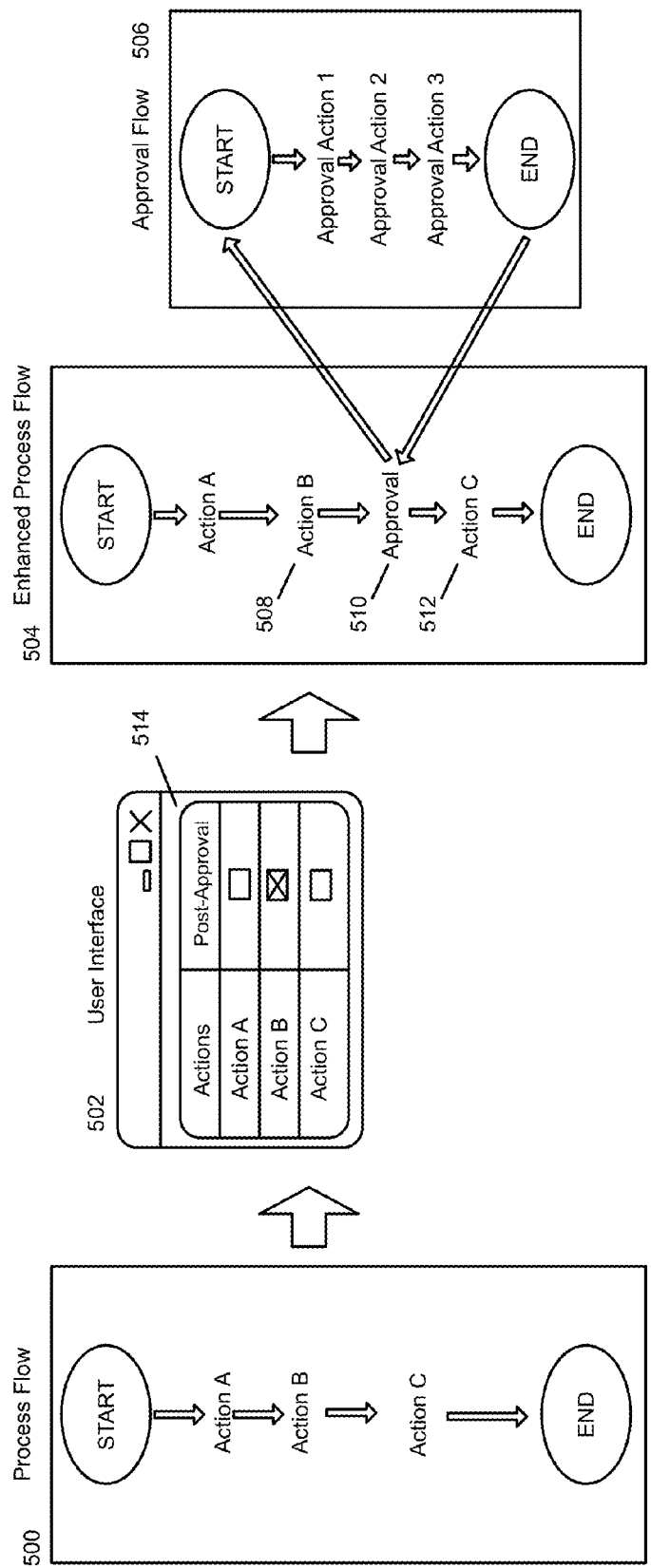
FIG. 5 illustrates an exemplary user interface utilized to modify an application according to one practice of the present invention.

FIG. 5 illustrates an alternative embodiment of the present invention wherein the enhanced functionality added to a Process Flow 500 is an approval review as opposed to the enhanced audit functionality illustrated in FIGS. 3 and 4. Similar to the Process Flows 300/400, the User Interface 302/402 and the Enhanced Process Flow 306/404 of FIGS. 3 and 4 as described above, the embodiment of the present invention shown in FIG. 5 includes a Process Flow 500, a User Interface 502 and an Enhanced Flow 504. In addition, the illustrated embodiment includes an Approval Flow 506 associated with an Approval Action 510 of the Enhanced Process Flow 504. The Approval Action 510 and related Approval Flow 506 represent the enhanced functionality added to Enhanced Process Flow 504.

Similar to the process flows previously described, Process Flow 500 includes a series of actions associated with an application or portion of an application (e.g., Application 118). The User Interface 502 is generated related to the Process Flow 500 such that a Selectable Action List 514 is displayed on the User Interface 502 including the actions of the Process Flow 500 (i.e., Actions A, B and C). The Selectable Action List 514 allows for identification of one or more these actions for which an enhanced 'Post-Approval' functionality can be specified. Once enabled, this 'Post-Approval' functionality will keep the process flow from completing the selected action/step and proceeding to the next step until 'Post-Approval' processing is completed. Such an enhanced functionality may be used in an instance where a manager is required to approve changes made during Action B 508 before proceeding to Action C 512.

In the illustrated embodiment, Action B of Process Flow 500 is selected from the Selectable Action List 514. Once the Enhancement Engine 116 receives this user selection through the User Interface 502, it will automatically update the Process Flow 500 to add the Approval Action 510 after the selected Action B and generate an Enhanced Process Flow 504 with the 'Post-Approval' enhanced functionality incorporated therein. This enhanced functionality makes use of the Approval Flow 506 that is referenced by Approval Action 510. Along with updating Process Flow 500 (and/or any steps included therein) to generate the Enhanced Process Flow 504, the Enhancement Engine 116 may also have generated and/or updated Approval Action 510 to provide a link between the Enhanced Process Flow 504 and a pre-existing Approval Flow 506. Alternatively or in addition, the Approval Flow 506 may itself be generated by the Enhancement Engine 116 to enable the enhanced approval functionality in response to the selection through the User Interface 502. In alternative embodiments, multiple approval actions (e.g., 510) and corresponding approval flows (e.g., 506) may be associated with one or more enhanced process flows (e.g., 504). Similarly, certain approval flows may link to one or more other approval flows. Still other variations in the configuration of enhanced approval functionality are possible.

As illustrated, the Approval Action 510 may be configured to halt processing of the Enhanced Process Flow 504 at run-time and initiate the Approval Flow 506. Actions 1, 2 and 3 included in the Approval Flow 506 may be performed before the run-time processing returns to the Enhanced Process Flow 504 and Action C 512 is initiated. In addition, any of the Actions A, B and C that were part of the Process Flow 500 may be updated in the Enhanced Process Flow 504 to account for the interim processing specified by the Approval Flow 506. This approval processing may be explained by way of a non-limiting example where the Process Flow 500 defines the steps to complete a product return by performing Action A to receive product information, Action B to receive payment information and Action C to reimburse the customer for the purchase price of the returned product. A company implementing the Process Flow 500 may wish to alter this return process by requiring managers to approve all product returns prior to reimbursing the purchase price. To enable manager approval prior to reimbursement, Action B is specified through the Selectable Action List 514, as the point after which manager approval should occur. In response to the selection, the Enhancement Engine 116 automatically generates the Enhanced Process Flow 504 to include the Approval Action 510 which triggers a 3-step manager approval process defined by Approval Flow 506. This 3-step process defined by Actions 1, 2 and 3 may include prompting a manager to approve or reject the return, alerting the internal finance team (e.g., via email) of the manager's response and sending a letter to the customer related to the final outcome of their return request. Once these 3 steps in the Approval Flow 506 are completed, the Enhanced Process Flow 504 continues at Action C 512 which is also updated to take the outcome of the manager approval step (i.e. Action 1) into account before reimbursing the customer.

Figure 6:
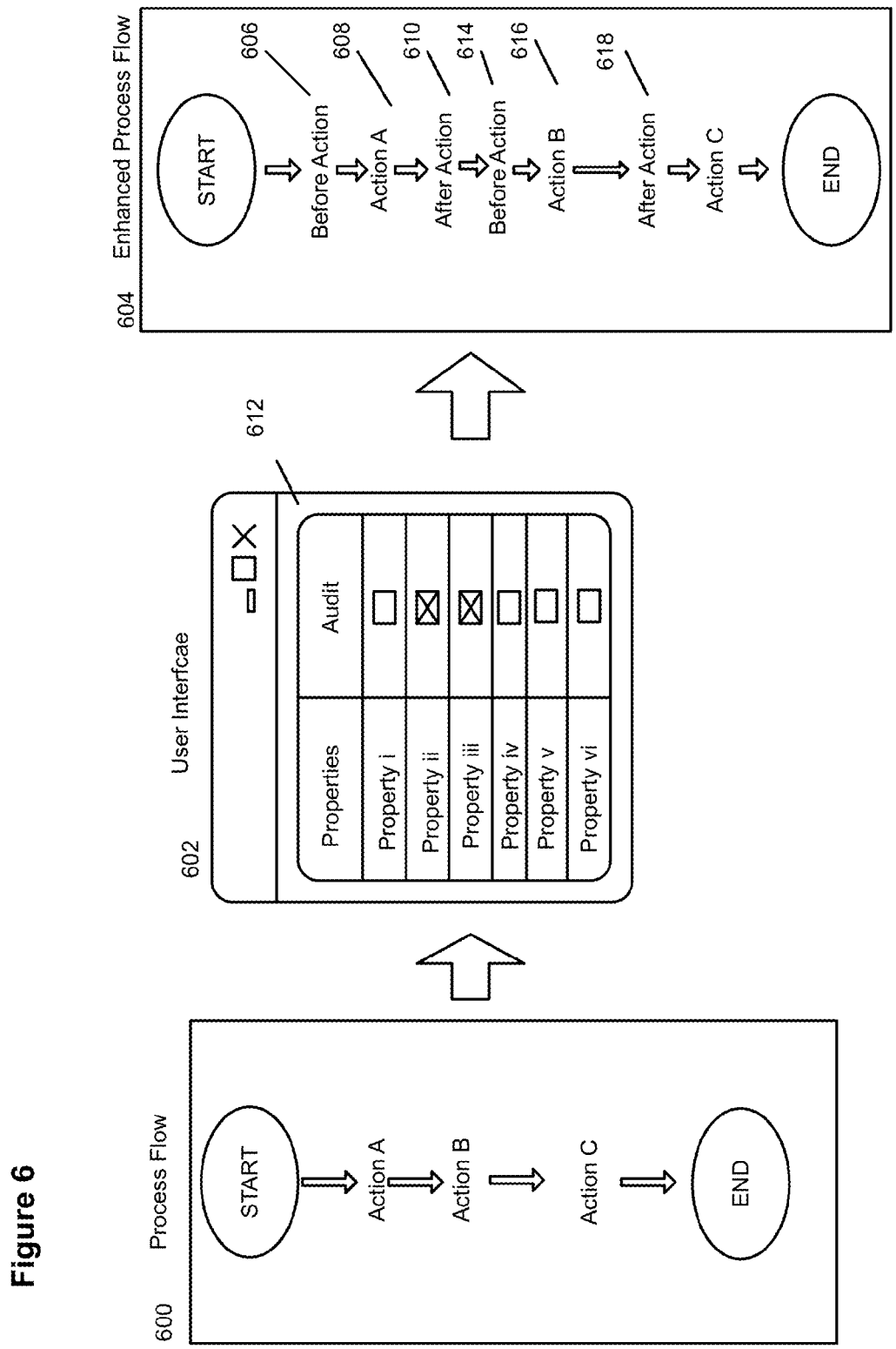
FIG. 6 illustrates an exemplary user interface utilized to modify an application according to one practice of the present invention.

FIG. 6 illustrates an embodiment of the present invention where enhanced functionality can be specified for one or more properties associated with a process flow. Similar to the embodiments of the present invention described with reference to FIGS. 3, 4 and 5, FIG. 6 illustrates a Process Flow 600, a User Interface 602 and an Enhanced Process Flow 604. The User Interface 602 includes a Selectable Properties List 612 comprising a list of properties that are associated with the actions of the Process Flow 600. Unlike the functionality of user interfaces illustrated in FIGS. 3, 4 and 5, a user can use the Selectable Properties List 612 in User Interface 602 to specify individual properties for enhanced functionality (e.g., Audit) without having to select any actions. This may be advantageous, for example, when a business user wishes to add enhanced audit or approval functionality for a sensitive property but is unaware of the specific action(s) that property is associated with. Also, in cases where a sensitive property is associated with multiple actions, a user may tag that property for enhanced functionality a single time and the enhanced functionality may be enabled for all actions that display, process, reference or otherwise make use of that property.

In the illustrated example in FIG. 6, the Selectable Properties List 612 includes properties i-vi, wherein i-ii relate to Action A, properties iii-iv relate to Action B, and properties v-vi relate to Action C. It should be noted that in certain embodiments of the present invention, a single property may be associated with more than one action in a process flow. When generating the Selectable Properties List 612, the properties for each action in the Process Flow 600 are identified and the Selectable Properties List 612 is generated accordingly. In a rules-based system (e.g., Rules System 104 in FIG. 1), where an action may be defined by one or more rules to generate a user interface for that action at run-time, identifying properties associated with the action may comprise analyzing or introspecting the one or more rules (e.g., using Enhancement Engine 116) to determine what properties or data elements are displayed by or otherwise associated with the user interface. Similarly, the Selectable Action Lists 304, 406, 514 may also be generated in a rules-based system by analyzing or introspecting the one or more rules that define the corresponding process flows (i.e. 300-500).

As illustrated in FIG. 6, property ii and property iii have been tagged for the enhanced audit functionality. Given that property ii is associated with Action A and property iii is associated with Action B, the Enhanced Process Flow 604 is configured to include a Before Action 606 and an After Action 610 to monitor changes to the value of property ii as a result of Action A 608 and a Before Action 614 and an After Action 618 to monitor changes to the value of property iii as a result of Action B 616. It will be appreciated that even though in the illustrated embodiment, the enhanced functionality specified for each property is audit functionality, in alternative embodiments, other types of enhanced functionality may be specified.

As described above, an exemplary embodiment of the invention may be used to audit any changes made to data (e.g., transactional data) processed by an application. By way of non-limiting example, such auditing may be enabled to support an application that processes and/or manages data related to pharmaceutical research. Under certain governmental regulations that are applicable to pharmaceutical research and development, any changes made to certain data values within a pharmaceutical research application must be tracked and documented according to strict data policies. These strict data policies include, for example, creating an enhanced audit record that stores an initial data value, an updated data value and the reason for updating the initial data value. To facilitate compliance with these strict data policies, an enhanced process flow (e.g., Enhanced Process Flows 306, 404 and 604) may be generated and linked with the pharmaceutical application using the methods and techniques described herein.

It will be appreciated that the design and functionality of the User Interfaces 302-602 in FIGS. 3-6 is for illustrative purposes only and may vary in alternative embodiments of the invention. For example, even though only actions and/or properties have been shown to be included in the selectable lists (e.g., Selectable Action List 304, 514, 612 etc.) for the purposes of specifying a corresponding 'Post Approval' or 'Audit' enhanced functionality, in alternative embodiments, other types of rules, data or other portions of an application may be included (e.g., in selectable lists) in one or more user interface for the purposes of specifying various types of enhanced functionality (e.g., Audit, Pre/Post Approval, reporting, encryption etc.) to be associated with a selected portion of the application. Still other variations are possible in the design and functionality of user interface(s) to be used to communicate with the Enhancement Engine 116 as described below.

The embodiments illustrated in FIGS. 3, 4, 5, and 6 each include a single user interface that displays actions and/or properties associated with a process flow (e.g., Process Flow 600). These process flows may be associated with an application and are defined by one or more rules. Since an application may comprise a large number of process flows and hence, many more rules, using a single screen for the purposes of specifying enhanced functionality for the various processes or rules associated with an application may result in an extremely complex and unwieldy user interface design. Therefore, embodiments of the present invention may provide for a series of screens (e.g., in a software wizard) that may be used by an administrator or other user to communicate with the Enhancement Engine 116 to specify and/or implement enhanced functionality for one or more software applications (e.g., Application 118).

By way of non-limiting example, an enterprise may use a Rules System (e.g., Rules System 104) that includes dozens of software applications (e.g., Application 118) used throughout the enterprise. Such applications may include HR, compliance, legal, procurement, project management and finance applications and all the rules (e.g., process flows, properties, business logic, user interfaces etc.) associated with such applications may be stored in one or more rule repositories (e.g., Rules Base 114). In such an embodiment, a software wizard may be used to help business users navigate the rules repository and identify a single action for which enhanced functionality can be specified as described above in connection with FIGS. 3, 4 and 5. The wizard may start by prompting the user to specify one or more applications that need to be modified (e.g., due to a change in applicable data policies within the enterprise) and then quickly 'drill-down' to the specific process flow, action, property or other rule through a series of screens. Alternatively, or in addition, the user may specify enhanced functionality for an entire application, group of rules or rule sets without having to drill down to individual rules. For example, using the techniques described herein, a user may specify an application for which all data must be encrypted prior to storage. In such an embodiment, the user may select the application through a user interface (e.g., similar to 302, 402 and 502) and specify 'encryption' as a type of enhanced functionality to be enabled for the selected application. The user's selections may be transmitted to the Enhancement Engine 116 which may, in turn, automatically update the appropriate encryption settings for the selected application by identifying one or more new rules as described above. The encryption settings may include, but are not limited to, a specific encryption cipher or algorithm and the required encryption keys (e.g. public or private keys required) depending on the specified cipher. At run-time of the application, for example in Rules System 104, the one or more new rules will be executed by the Rules Engine 112 to encrypt and/or decrypt the transactional data being processed by the application in accordance with the encryption settings. It will be appreciated that other variations are possible in the design and implementation of encryption-related enhanced functionality using the Enhancement Engine 116 in an application.

In addition to enabling encryption, enhanced audit and/or approval processing, other types of enhanced functionality may be enabled in an application without any manual coding using the methods and techniques described herein. By way of non-limiting example, a user may tag or otherwise specify one or more properties in an application (e.g., Application 118) as 'required' using, for example, a Selectable Properties List (e.g., 408, 612) through a user interface (e.g., 402, 602). Upon receiving the user's request, the Enhancement Engine 116 may identify one or more new rules (as described above in connection with FIG. 2) to update the display format (e.g., by updating the appropriate style sheet(s)) of the selected properties such that they appear highlighted on any user interface (e.g., 800, 900*a*) that is configured to display the selected properties. Furthermore, the one or more new rules may add validation logic to such user interfaces in order to ensure that the selected property values are not null during run-time of the user interfaces. Still other types of enhanced functionality may be enabled in an application using the methods and systems described herein.

Figure 7:
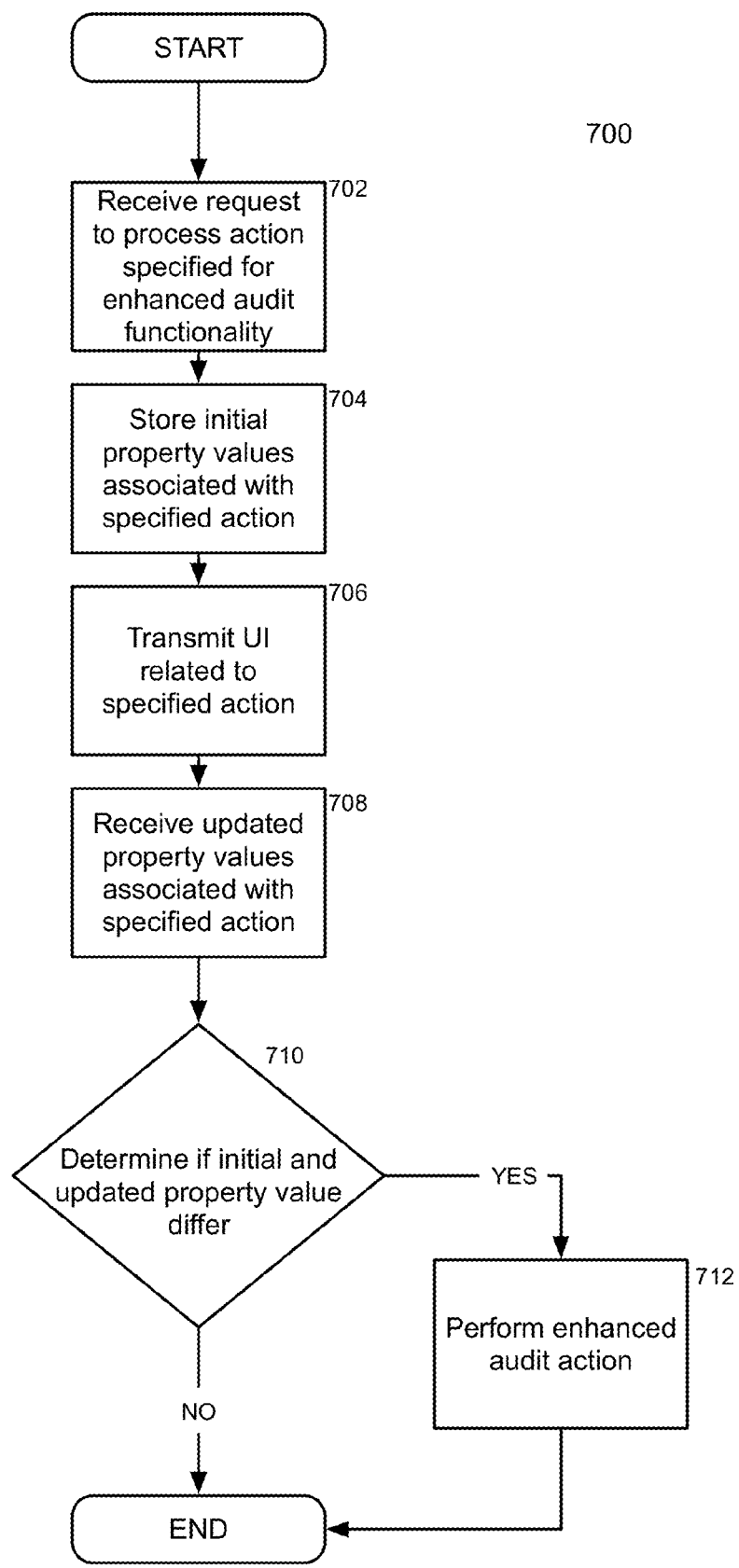
FIG. 7 illustrates an exemplary method of processing an action specified for enhanced audit functionality according to one practice of the present invention.
Figure 9:
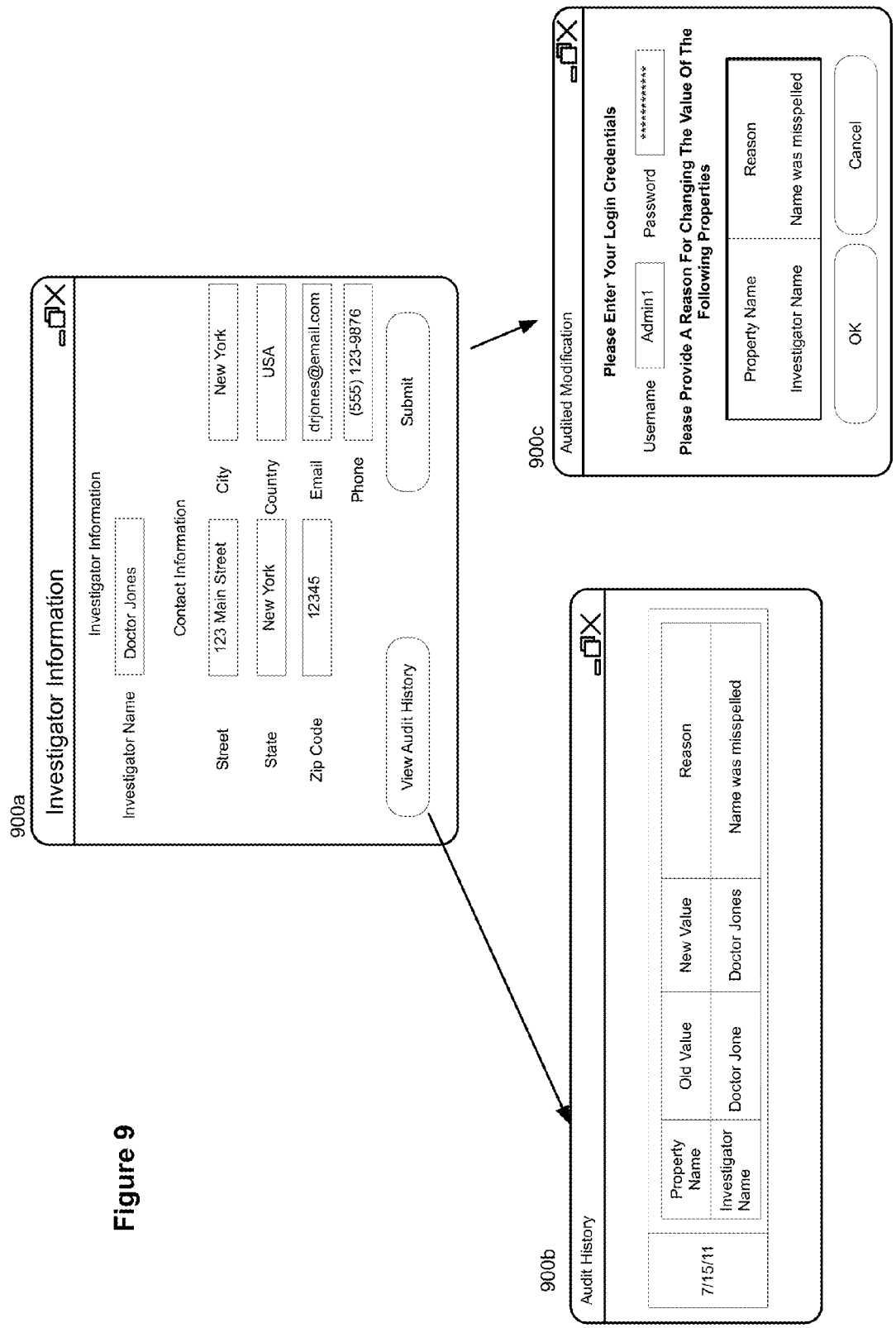
FIG. 9 illustrates a series of exemplary user interfaces utilized during an enhanced audit action according to one practice of the present invention.

FIG. 7 illustrates a method 700 of execution of an enhanced process flow (e.g., 504, 604 etc.) where at least one action or step has been specified for enhanced audit functionality (e.g., as illustrated in FIG. 3 above) using the techniques described herein. In the context of the example of a pharmaceutical research application mentioned above, an action specified for enhanced audit functionality may include generating a user interface that displays multiple properties or data elements associated with a research investigator. The identity of an investigator working on pharmaceutical research may be critical to the integrity of data related to a research project. Therefore, any application that is used to process investigator information may be required to monitor and/or audit any changes to such information. To facilitate such auditing, enhanced audit functionality may be specified for any action that generates a user interface through which investigator information may be reviewed and altered. User Interface 800 shown in FIG. 8 provides an exemplary layout of such a user interface generated as part of an action that has not yet been marked or otherwise specified for enhanced audit functionality. In contrast, User Interface 900*a* shown in FIG. 9 depicts an updated user interface that is generated after that action has been specified for enhanced audit functionality. In response to such specification, the updated user interface 900*a* may be generated by identifying a new rule using the Enhancement Engine 116 as described above for FIG. 2. The processing of the specified process action as part of a enhanced process flow at run-time is further explained below in connection with FIG. 7.

Method 700 begins at step 702 with the receipt of a request (e.g., by a Rules Engine 112 from client device 124 over network 132) to process an action that has been specified for enhanced functionality. Using the example above, step 702 may involve a request for a user interface to display investigator information at run-time of a pharmaceutical research application where the action for generating the user interface has previously been specified for enhanced audit functionality. As a result, in response to the request at step 702, method 700 continues at step 704 by performing a before action of saving (e.g., temporarily in local memory) the initial or existing property values that are to be displayed on the user interface for investigator information. Following the storage of the initial property values, the updated user interface 900*a* is transmitted (e.g., to the client device 124) at step 706 such that a user may view and alter the initial property values. As illustrated in FIG. 8, the initial property values may be as follows—Investigator Name: Doctor Jone, Street: 123 Main Street, City: New York, State: New York, Zip: 12345, Country: USA, Email: drjone@email.com, and Phone: (555)123-9876. Upon reviewing the investigator information, a user may alter the investigator name property value to correct a misspelling of the investigator's name from "Doctor Jone" to "Doctor Jones." This is illustrated in FIG. 9 where user interface 900*a* is shown to display the corrected spelling of the investigator's name. Following the changes made by a user to the initial property values, the user may try to permanently update the investigator information data record by clicking the "Submit" button on user interface 900*a* to submit the new values to a server (e.g., 102) for permanent storage. At that point, method 700 proceeds to step 708 where the new property value(s) are received (e.g., by Rules Engine 112) at the digital data processor (e.g., 102) that is processing the specified action. To identify changes made to the property values, an after action is executed at step 710 which compares the new property values submitted through user interface 900*a* with the initial property values that were previously stored in memory. If no discrepancy is found between the initial property values and the new property values, method 700 is complete and no other enhanced audit functionality or action is required. However, if a discrepancy is found between the two values, method 700 proceeds to step 712 to perform an enhanced audit action.

As illustrated, the enhanced audit action 712 includes authenticating or re-authenticating the user who is attempting to update the property values. In addition, the user is prompted to provide a text description of the rationale behind making changes to the property values associated with the specified action. Both of these enhanced audit functions are accomplished via user interface 900*c* in the illustrated embodiment where the property value of investigator's name is permanently updated upon successfully authenticating the user credentials. In case the user is not successfully authenticated, the property values are not changed and the user may see an error message alerting them of the failed attempt.

A user may also view an enhanced audit log 900*b* by clicking the 'View Audit History' button on the user interface 900*a*. In the illustrated embodiment, this button was added to user interface 800 in response to the action associated with generating that interface being specified for enhanced audit functionality. User interface 800 is modified to form user interface 900*a* that includes the button by identifying one or more rules as described above in FIG. 2 discussion. The button is added to facilitate a quick review of any changes to data that is deemed sensitive by users of an application. In the illustrated embodiment, a user may click the button to see the initial and new values of the investigator's name, reason for change and a date stamp on when the information was updated.

It will be appreciated the user interfaces depicted in FIGS. 8 and 9 and the corresponding enhanced audit functionality is for illustrative purposes only. In other embodiments, other types of user interfaces or enhanced functionality may be implemented when processing an action specified for such enhanced functionality. For example, an additional approval process may be triggered and other screens displayed upon successful authentication of the user using user interface 900*c*. Furthermore, users may be prompted to provide additional data related to the attempted change of property values. Still other variations in user interface design and enhanced functionality are possible.

Similarly, steps of method 700 may be modified without departing from the spirit of the invention. For example, step 710 may be configured in certain embodiments of the invention to ignore a discrepancy between a new value for a property and an initial null value for that property. This may indicate that an underlying data record is being created for the first time and hence, no enhanced audit action designed to monitor changes to existing records is needed. However, in other embodiments, step 710 may be configured to detect and audit all data discrepancies. Still other variations in the steps of method 700 are possible.

It is to be understood that the exemplary embodiments are merely illustrative of the invention and that many variations of the above-described embodiments may be devised by one skilled in the art without departing from the scope of the invention. It is therefore intended that all such variations be within the scope of the following claims and their equivalents.

The invention claimed is:

1. A computer implemented method for enabling enhanced functionality in an application, the method comprising:
executing, on a computer, an enhancement engine communicatively coupled to at least one of (i) a rules base that contains rules and (ii) a rules engine that executes the rules;
receiving, with the enhancement engine, a request that specifies (i) a selected rule from among a plurality of rules, and (ii) a type of an enhanced functionality to be enabled in an application, wherein the application is defined, at least in part, by said plurality of rules, wherein the selected rule references a data element in a process flow that specifies a plurality of actions associated with the application, and wherein the type of the enhanced functionality includes one or more of auditing, pre-approval, post-approval, encryption, resource management, access security, and reporting;
identifying, with the enhancement engine, a new rule based on the type of the enhanced functionality and based on the selected rule specified in the request, wherein the new rule comprises an additional rule other than the selected rule that supplements the selected rule in the rules base, wherein the new rule defines at least a portion of the enhanced functionality to be enabled in the application, wherein at least the portion of the enhanced functionality defined by the new rule enables the application to generate an audit record of an attempt to assign a new value to the data element, and wherein the audit record includes the new value assigned to the data element, an other value of the data element that was previously stored in a memory, and a reason received from a user for assigning the new value; and
effecting, with the enhancement engine, at least one of (i) updating the application to include the new rule in addition to the selected rule for execution with the plurality of rules that define the application at least in part, and (ii) execution of the new rule in addition to the selected rule by the rules engine with said plurality of rules, wherein said execution of the new rule enables at least the portion of the enhanced functionality.

2. The method of claim 1, wherein the new rule comprises an updated version of at least one of the said plurality of rules that defines the application other than the selected rule.

3. The method of claim 2, comprising, with the enhancement engine, reporting an error if the one of the said plurality of rules is unavailable for updates.

4. The method of claim 1, wherein the receiving step includes providing a user interface that is used to specify the selected rule.

5. The method of claim 4, wherein the receiving step includes marking the selected rule in a selectable list displayed in the user interface.

6. The method of claim 4, wherein the receiving step includes specifying the selected rule by marking an other rule that references the selected rule.

7. The method of claim 1, wherein the identifying step includes identifying a said new rule that defines at least a portion of enhanced functionality enabling the application to identify the attempt to assign the new value to the data element by detecting a discrepancy between the new value and the other value of the data element that was previously stored in the memory.

8. The method of claim 7, wherein the identifying step includes identifying a said new rule that defines at least a portion of enhanced functionality enabling the application to perform an additional step prior to assigning the new value to the data element.

9. The method of claim 8, wherein the identifying step includes identifying a said new rule that defines at least a portion of enhanced functionality enabling the application to perform a said additional step of prompting the user for inputting the reason for assigning the new value.

10. The method of claim 8, wherein the identifying step includes identifying a said new rule that defines at least a portion of enhanced functionality enabling the application to perform a said additional step of prompting the user to any of authenticate and re-authenticate their identity.

11. The method of claim 8, wherein the identifying step includes identifying a said new rule that defines at least a portion of enhanced functionality enabling the application to perform a said additional step of executing an approval flow.

12. The method of claim 1, wherein the receiving step includes receiving a request to enable the type of an enhanced functionality for the selected rule that is an action associated with the process flow.

13. The method of claim 12, wherein the identifying step includes identifying a said new rule that defines at least a portion of enhanced functionality that further enables the application to execute an approval flow after the action.

14. The method of claim 12, wherein the identifying step includes identifying a said new rule that defines at least a portion of enhanced functionality that further enables the application to execute an approval flow before the action.

15. A system for enabling enhanced functionality in an application, the system comprising:
a rules base that contains rules;
a rules engine that executes the rules;
an enhancement engine communicatively coupled to at least one of (i) the rules base and (ii) the rules engine; and
at least one processor communicatively coupled to the enhancement engine,
wherein the at least one processor is configured to:
receive a request that specifies (i) a selected rule from among a plurality of rules, and (ii) a type of an enhanced functionality to be enabled in an application, wherein the application is defined, at least in part, by said plurality of rules, wherein the selected rule references a data element in a process flow that specifies a plurality of actions associated with the application, and wherein the type of the enhanced functionality includes one or more of auditing, pre-approval, post-approval, encryption, resource management, access security, and reporting;
identify a new rule based on the type of the enhanced functionality and based on the selected rule specified in the request, wherein the new rule comprises an additional rule other than the selected rule that supplements the selected rule in the rules base, wherein the new rule defines at least a portion of the enhanced functionality to be enabled in the application, wherein at least the portion of the enhanced functionality defined by the new rule enables the application to generate an audit record of an attempt to assign a new value to the data element, and wherein the audit record includes the new value assigned to the data element, an other value of the data element that was previously stored in a memory, and a reason received from a user for assigning the new value; and
effect at least one of (i) updating the application to include the new rule in addition to the selected rule for execution with the plurality of rules that define the application at least in part, and (ii) execution of the new rule in addition to the selected rule by the rules engine with said plurality of rules, wherein said execution of the new rule enables at least the portion of the enhanced functionality.

16. The system of claim 15, wherein the new rule comprises an updated version of at least one of the said plurality of rules that defines the application other than the selected rule.

17. The system of claim 15, wherein the processor configured to receive the request that specifies (i) the selected rule from among a plurality of rules, and (ii) the type of the enhanced functionality to be enabled in an application includes the processor being configured to provide a user interface that is used to specify the selected rule.

18. The method of claim 8,
wherein the new rule that defines at least the portion of enhanced functionality enabling the application to perform the additional step prior to assigning the new value to the data element is configured to insert one or more additional actions corresponding to the additional step into the process flow, and
wherein the one or more additional actions are inserted before an action in the process flow that is configured to assign the new value to the data element.

19. The method of claim 18, wherein the one or more additional actions inserted into the process flow corresponding to the additional step are configured to:

prompt the user to any of authenticate and re-authenticate their identity, and
upon a determination that the user is authenticated:
prompt the user to input the reason for assigning the new value to the data element, and
generate the audit record of the attempt to assign the new value to the data element.

20. The system of claim 15, wherein the processor is configured to identify a said new rule that defines at least a portion of enhanced functionality enabling the application to identify the attempt to assign the new value to the data element by detecting a discrepancy between the new value and the other value of the data element that was previously stored in the memory,
wherein the processor is configured to detect the discrepancy by:
identifying an action in the process flow that is configured to assign the new value to the data element;
inserting a first action into the process flow prior to the identified action, wherein the first action is configured to store the other value of the data element in the memory, and
inserting a second action into the process flow after the identified action, wherein the second action is configured to detect the discrepancy between the new value and the other value of the data element by comparing the new value with the other value.

* * * * *